United States Patent Office 3,121,111
Patented Feb. 11, 1964

---

3,121,111
NOVEL 4-THIOHYDANTOIC ACIDS
Arthur Berger, Skokie, and Edeltraut E. Borgaes, Chicago, Ill., assignors to Baxter Laboratories, Inc., Morton Grove, Ill., a corporation of Delaware
No Drawing. Filed June 20, 1960, Ser. No. 37,066
6 Claims. (Cl. 260—534)

The present invention relates to novel thiohydantoic acids and their derivatives and to the method by which they are prepared. More particularly it relates to the novel 4-thiohydantoic acids represented by the following formula:

$$R_2NHCSNHCHR_1CO_2H$$

in which $R_2$ is an alkyl, alkenyl or aralkyl group; and $R_1$ is an alkyl or aralkyl group.

The novel 4-thiohydantoic acids of the present invention show promise as effective and useful agents for the treatment of convulsant stages in animals. In addition to being promising anti-convulsants themselves, these 4-thiohydantoic acids are readily converted, upon heating, to known 2-thiohydantoins which may be used for the treatment of epilepsy and similar convulsant conditions.

The 4-thiohydantoic acids may be conveniently prepared by reacting an amino acid with an alkyl, alkenyl or aralkyl isothiocyanate at an elevated temperature under alkaline conditions, and then acidifying the reaction mixture to precipitate the free form of the acid.

In the preferred practice of the present invention, the amino acid and the isothiocyanate are reacted at 60°–110° C. under alkaline conditions. When the reaction is essentially complete (3–10 hours), the mixture is allowed to cool and sufficient acid added with continual cooling to convert the salt of the 4-thiohydantoic acid to the free acid form. The 4-thiohydantoic acid which then crystallizes may be further purified if desired by washing with methylene chloride.

The amino acids contemplated for use in the present invention are those amino acids of the formula:

$$R_1CHCO_2H$$
$$|$$
$$NO_2$$

in which $R_1$ is an alkyl or aralkyl group. Especially preferred for use in the present invention are those amino acids in which $R_1$ is an alkyl group of 1–5 carbon atoms or a benzyl group. Illustrative of such amino acids are leucine, alanine, alpha aminobutyric acid, norvaline, norleucine, phenylalanine, and the like.

The isothiocyanates contemplated for use in the present invention are those compounds of the formula $R_2NCS$ in which $R_2$ is an alkyl, alkenyl or aralkyl group. Illustrative of such compounds are allyl isothiocyanate, methyl isothiocyanate, ethyl isothiocyanate, propyl isothiocyanate, butyl isothiocyanate, isobutyl isothiocyanate, benzyl isothiocyanate, and the like.

The practice of the present invention is further illustrated by reference to the following examples:

Example I

Leucine (1.0 mole, 131 grams) was mixed with 200 ml. of 5 N sodium hydroxide and 100 ml. of allyl isothiocyanate added. The mixture was heated under reflux for 8 hours, allowed to cool, and added to 2000 g. of crushed ice plus 150 ml. of conc. hydrochloric acid. The white solid 5-allyl-2-isobutyl-4-thiohydantoic acid which formed was collected after most of the ice had melted. It was already fairly pure, M.P. 113–6°, and after washing with methylene chloride had a M.P. 116–8° and a neutral equivalent of 231 (theoretical 230). The yield of purified 5-allyl-2-isobutyl-4-thiohydantoic acid was 184 g. (80% of theoretical). The 5-allyl-2-isobutyl-4-hydantoic acid was then heated at 130° for 30 minutes or under reflux with dilute hydrochloric acid for 10 minutes. The 3-allyl-5-isobutyl 2-thiohydantoin thus obtained had a M.P. of 110–111° C. and a sulphur content of 15.10% (calculated 15.03%) after purification.

Example II

The procedure of Example I was repeated using norvaline in place of the leucine. The white crystals of 5-allyl-2-n-propyl-4-thiohydantoic acid ($C_9H_6N_2O_2S$) thus obtained had a melting point of 93–4° C., a nitrogen content of 12.78% (calculated 12.95%) and a sulfur content of 14.82% (calculated 14.82%).

Example III

A mixture of 65.5 g. (0.50 mole) of leucine, 100 ml. (0.50 mole) of 5 N sodium hydroxide and 57.6 g. (0.50 mole) of butyl isothiocyanate was refluxed for 3 hours. After cooling to room temperature, the mixture was acidified and further cooled by addition to a mixture of 50 ml. of conc. hydrochloric acid and 500 g. of chipped ice. The light yellow plates of 5-n-butyl-2-isobutyl-4-thiohydantoic acid which formed were collected on a filter. Purification was readily effected by dissolving the acid in chloroform and adding the chloroform solution to ethyl ether. White shiny plates of the acid with M.P. of 101–3° were obtained, the melting point of which was not changed by washing with methylene chloride or other purification processes. The yield of purified 5-n-butyl-2-isobutyl-4-thiohydantoic acid was 96.0 g. (78% of the theoretical).

Example IV

The procedure of Example III was repeated using ethyl isothiocyanate in place of the butyl isothiocyanate. The white crystals of 5-ethyl-2-isobutyl-4-thiohydantoic acid ($C_9H_{18}N_2O_7S$) thus obtained had a melting point of 120–2° C., a nitrogen content of 12.58% (calculated 12.83%), and a sulfur content of 15.13% (calculated 14.69%).

Example V

The procedure of Example III was repeated using propyl isothiocyanate in place of the butyl isothiocyanate. The white crystals of 5-propyl-2-isobutyl-2-thiohydantoic acid ($C_{10}H_{20}N_2O_2S$) thus obtained had a melting point of 108–10° C., a nitrogen content of 12.15% (calculated 12.06%) and a sulfur content of 13.62% (calculated 13.80%).

Example VI

The procedure of Example III was repeated using benzyl isothiocyanate in place of the butyl isothiocyanate. The white crystals of 5-benzyl-2-isobutyl-4-thiohydantoic acid ($C_{14}H_{20}N_2O_2S$) thus obtained had a melting point of 147–8° C., a nitrogen content of 9.99% (calculated 9.99%), and a neutralization equivalent of 281.5 (calculated 280.4).

While in the above examples sodium hydroxide and hydrochloric acid have been used to adjust first to an alkaline and then to an acidic pH, the present invention is not limited to the use of these reagents. For example, it is only necessary in the present invention to employ an alkaline reagent which is more strongly basic than the amino acid reactant. Illustrative of such basic substances are sodium carbonate, potassium hydroxide, barium hydroxide, magnesium hydroxide, and the like. The acidic reagent, employed in the present invention serves only to adjust the pH of the reaction mixture to acidity to convert the 4-thiohydantate salt to the acid form. Therefore, a wide variety of acids such as sulfuric acid, phosphoric acid, acetic acid, and the like, may be used to liberate the free acid form of the novel compounds. Trial testing or reference to chemical property tables will, of course, further facilitate the selection of proper reagents.

It will be readily apparent to those skilled in the art that a wide variety of changes and modifications may be made without departing from the spirit and scope of the present invention.

The embodiments of the present invention in which an exclusive property or privilege is claimed are as follows:

1. The 4-thiohydantoic acids of the formula $$R_2NHCSNHCHR_1CO_2H$$

in which $R_2$ is a member selected from the class consisting of lower alkyl, allyl, and benzyl groups, and $R_1$ is a member of the class consisting of lower alkyl and benzyl groups.
2. 5-allyl-2-isobutyl-4-thiohydantoic acid.
3. 5-n-butyl-2-isobutyl-4-thiohydantoic acid.
4. 5-allyl-2-n-propyl-4-thiohydantoic acid.
5. 5-ethyl-2-isobutyl-4-thiohydantoic acid.
6. 5-propyl-2-isobutyl-4-thiohydantoic acid.

References Cited in the file of this patent
UNITED STATES PATENTS

| | | |
|---|---|---|
| 2,636,045 | Halpern | Apr. 21, 1953 |
| 2,829,157 | McKinney | Apr. 1, 1958 |

OTHER REFERENCES

Doub et al.: "J. Am. Chem. Soc.," vol. 80, 2205–17 (1958).

Elmore et al.: "J. Chem. Soc." (1958), pages 1141–5.

Marckwald et al.: "Deutsche Chem. Gesellschaft-Berichte," vol. 24, part III, 1891, pages 3278–3298.